(12) United States Patent
Alsup

(10) Patent No.: US 7,610,517 B2
(45) Date of Patent: Oct. 27, 2009

(54) MICROPROCESSOR WITH TRACE FUNCTIONALITY

(75) Inventor: Andrew David Alsup, Albuquerque, NM (US)

(73) Assignee: Innovasic, Inc., Albuquerque, NM (US)

( * ) Notice: Subject to any disclaimer, the term of this patent is extended or adjusted under 35 U.S.C. 154(b) by 313 days.

(21) Appl. No.: 11/521,916

(22) Filed: Sep. 14, 2006

(65) Prior Publication Data

US 2008/0126877 A1 May 29, 2008

(51) Int. Cl.
*G06F 11/00* (2006.01)

(52) U.S. Cl. ........................................................ 714/45

(58) Field of Classification Search ................ 714/45, 714/10; 712/226, 227
See application file for complete search history.

(56) References Cited

U.S. PATENT DOCUMENTS

| | | | | |
|---|---|---|---|---|
| 5,642,479 A | * | 6/1997 | Flynn | 714/45 |
| 5,724,505 A | * | 3/1998 | Argade et al. | 714/45 |
| 5,737,516 A | * | 4/1998 | Circello et al. | 714/38 |
| 5,758,188 A | | 5/1998 | Appelbaum et al. | |
| 6,035,422 A | * | 3/2000 | Hohl et al. | 714/35 |
| 6,041,426 A | * | 3/2000 | Qureshi | 714/719 |
| 6,145,123 A | * | 11/2000 | Torrey et al. | 717/128 |
| 6,148,381 A | * | 11/2000 | Jotwani | 711/158 |
| 6,401,154 B1 | | 6/2002 | Chiu et al. | |
| 6,625,719 B2 | | 9/2003 | Leach et al. | |
| 6,934,886 B2 | * | 8/2005 | Ok | 714/34 |
| 7,055,070 B1 | * | 5/2006 | Uhler et al. | 714/45 |
| 7,055,078 B2 | * | 5/2006 | Kwon | 714/734 |
| 7,149,926 B2 | * | 12/2006 | Ahmad et al. | 714/30 |
| 7,334,161 B2 | * | 2/2008 | Williams et al. | 714/34 |
| 2003/0189940 A1 | | 10/2003 | Greenblat | |

OTHER PUBLICATIONS

MIPS32 M4K Processor Core Software User's Manual, Dec. 2003, MIPS Technologies Inc.I*

* cited by examiner

*Primary Examiner*—Robert Beausoliel
*Assistant Examiner*—Amine Riad
(74) *Attorney, Agent, or Firm*—Donald J Lenkszus

(57) ABSTRACT

A trace function method for microprocessors is provided. The method is operable with a microprocessor comprising an execution unit operable in one or a plurality of contexts. The method comprises: providing a memory coupled to the execution unit, utilizing the memory to store trace data during a trace operation; and providing hardware utilizable during a trace operation to assist in the trace operation.

50 Claims, 9 Drawing Sheets

Trace Control Register

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Enable | Full | Res | Timing | Trace Mode | | Res. | | Buffer Mode | | Res. | | Buffer Size | | | |

Base Write Address Register

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| BASE WRITE ADDRESS ||||||||||||||||||||||||||||||||

Break Point Address/Watch Point Base Address Register

301  FIG. 3A

Watch Point Data Register

303  FIG. 3B

Watch Point Base Data Mask Register

305  FIG. 3C

Break/Watch Point Control Register.

307

MICROPROCESSOR WITH TRACE FUNCTIONALITY

FIELD OF THE INVENTION

The present invention pertains to microprocessors, in general, and to a microprocessor debug feature that provides trace capability, in particular.

BACKGROUND OF THE INVENTION

To debug micro-processor code it is desirable to provide trace functionality. A call trace involves providing the target of every call instruction and return instruction. This provides basic program flow data to the user for program analysis.

A branch trace involves providing the target of every branch instruction in addition to the calls and returns. This provides detail to the user for program analysis.

In addition to call and branch data, it is desirable to provide context switch and interrupt data for user. For a context switch, it is desirable to provide the context number.

The mechanism for obtaining this data on a standard microprocessor is to instrument the customer's code, libraries, etc. Problems with this approach include the fact that code is modified in order to capture the data necessary for the analysis.

Some micro-processors provide a trace feature that does not have a performance overhead. Such micro-processors require a dedicated trace interface on the micro-processor chip and a dedicated hardware tool connected to the microprocessor any time the trace function is to be used.

SUMMARY OF THE INVENTION

In accordance with the principles of the invention, a method for providing trace functionality for a microprocessor comprising an execution unit comprises: providing a memory coupled to the execution unit, utilizing the memory to store trace data during a trace operation; and providing hardware utilizable during a trace operation to assist in the trace operation.

In accordance with the principles of the invention the method is operable with a microprocessor comprising an execution unit operable in one or a plurality of contexts. The method comprises: providing a buffer memory coupled to the execution unit. The buffer memory is utilized to store trace data during operation of the execution unit. The method includes providing a trace control coupled to the execution unit and to the buffer memory; providing a breakpoint control coupled to the execution unit, the trace control and the buffer memory; providing a plurality of sets of programmable registers, and each set comprising a base address register, a data register, a data mask register and a control register; and providing in the trace control a programmable trace control register and a programmable base write address register, the trace control register being programmable to determine one of a plurality of trace functions.

In accordance with an aspect of the invention the buffer may be filled with data trace rather than code execution trace. In this case the user specifies a memory location or range of locations and, optionally, a data mask to filter the contents of writes to the memory, when a write occurs to the specified location(s) the data written is mirrored to the trace buffer. An example application would be to trace on all data received over a UART to try to debug associated driver code.

In accordance with another aspect of the invention, a timed trace function is also provided. In accordance with the timed trace, in addition to writing data to the trace buffer, the contents of a timer register are also written out. This provides a timestamp for each value/address written to the buffer, giving the user detailed execution timing for either code or a communications interface.

DESCRIPTION OF THE DRAWING

The invention will be better understood from a reading of the following detailed description of an illustrative embodiment of the invention in conjunction with the drawing figures in which:

FIG. 1 illustrates a register layout in the illustrative embodiment;

FIG. 2 illustrates a second register layout in the illustrative embodiment;

FIGS. 3A, 3B, 3C, and 3D illustrate the layouts of a series of registers in accordance with the principles of the invention;

DETAILED DESCRIPTION

A feature of the debug environment in accordance with the principles of the invention is that trace is saved to the standard address space. That is, the user can enable call trace or branch trace, and the results are written to any memory in the system as specified by the user.

For example, if a user enables call trace into external RAM, then each time that an instruction that causes a subroutine call is executed, the address of the routine being called is written to the memory range specified when setting up the trace function. When a return from subroutine instruction is executed, the address that is returned to is written into the trace buffer. These two elements enable a user with the help of appropriate tools to examine program flow after the fact by dumping and inspecting the trace buffer.

A branch trace involves storing the target of every branch instruction in addition to the calls and returns described above. This provides additional detail to a user for analysis.

In addition to calls and branches, context switches and interrupt data are stored so that a user can know about these kinds of changes of code flow as well. On a context switch, the context number is also stored.

As noted above one mechanism for obtaining trace data on a standard microprocessor is to instrument the customer's code, libraries, etc., but a problem with this approach is that that code is modified in order to capture the data necessary for the analysis. In accordance with the principles of the invention no modification of the code or reloading of code is necessary. In addition the inventive approach also entails less overhead on the processor.

Figure 9:
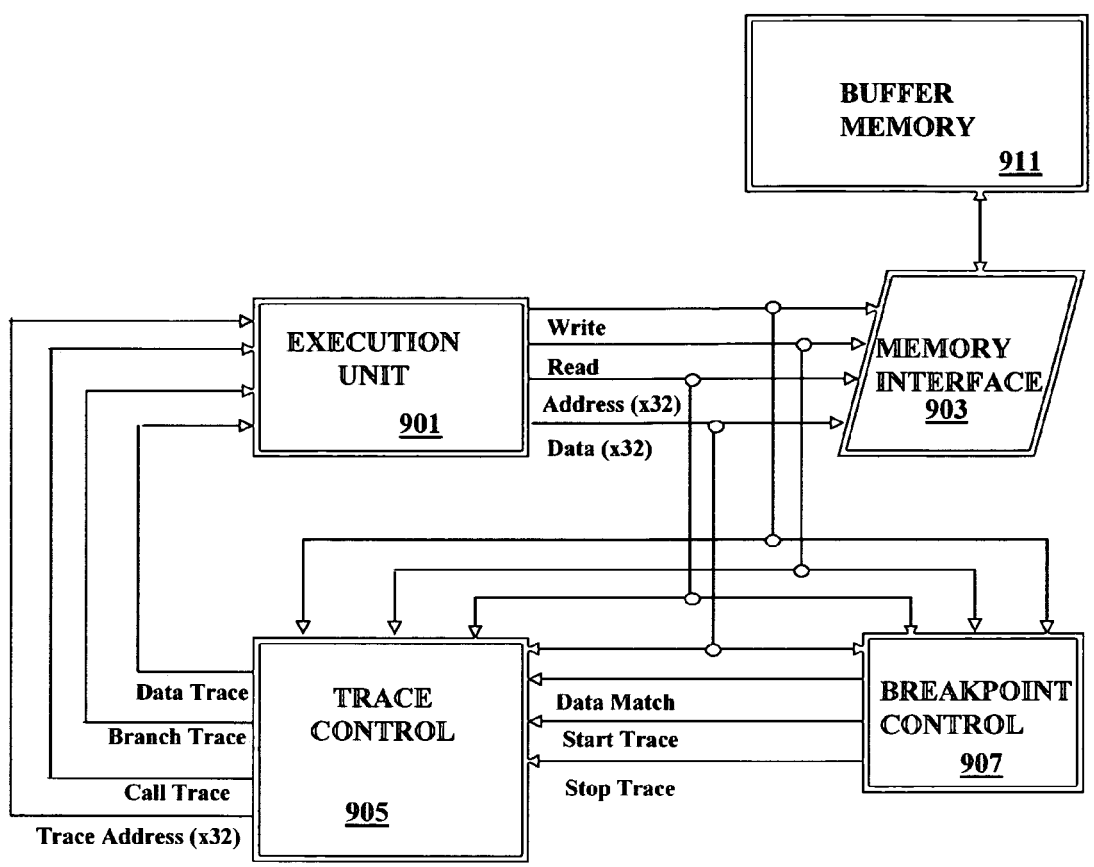
FIG. 9 is a block diagram of a microprocessor in accordance with the principles of the invention.

A block diagram of a microprocessor in accordance with the principles of the invention that provides the trace functionalities described above is shown in FIG. 9. Execution unit 901 can be the microprocessor described in United States Patent Application Publication Nos. US-2006-0168426-A1, US-2006-0168428-A1, US-2006-0168420-A1, and US-2006-0168421-A1. The entireties of the disclosures of each of those Publication Nos. are incorporated herein by reference.

Execution unit 901 has connections to a memory interface 903. The connections include Write and Read control lines, Address and Data buses. The memory interface 903 provides connections to any existing memory utilized by execution unit 901 including a trace buffer memory, that may be a designated portion of an existing memory or a separate trace buffer memory.

A memory 911 is shown coupled to memory interface 903. Memory 911 may be a memory existing on the same chip as the execution unit 901, another memory associated with execution unit 901 or a separate memory dedicated as a trace buffer.

The Write and Read control lines, Address and Data buses are coupled to a Trace Control 905 and a Breakpoint Control 907.

Figure 10:
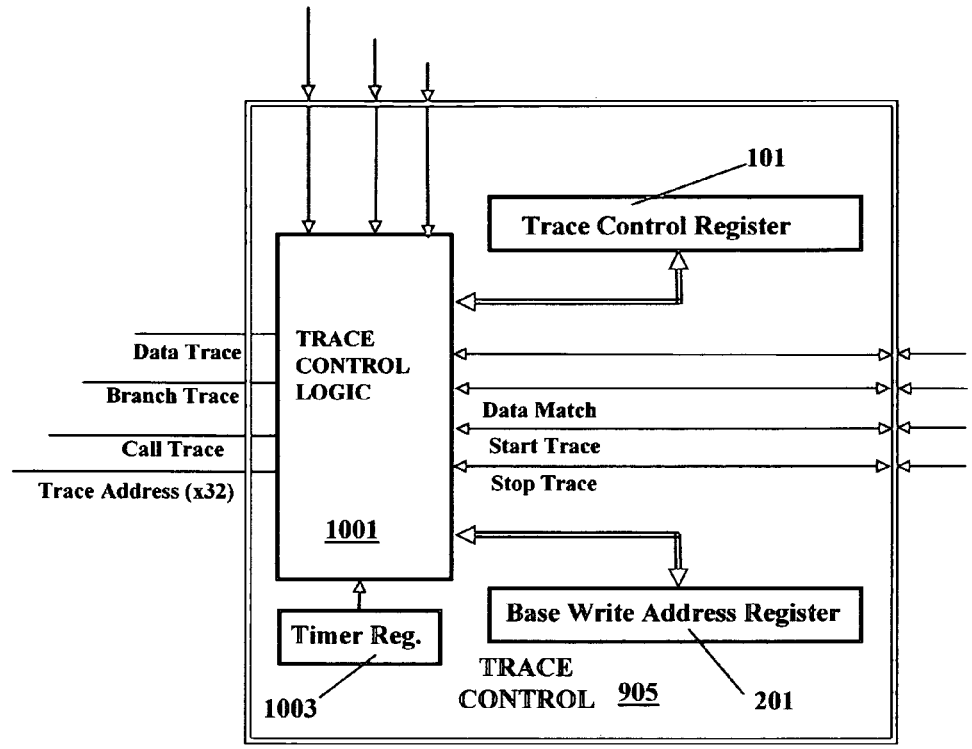
FIG. 10 is a block diagram of a Trace Control portion of the microprocessor of FIG. 9.

FIG. 10 shows Trace Control 905 in greater detail. Trace Control 905 includes the Trace Control Register 101 shown in detail in FIG. 1 and the Base Write Address Register 201 shown in detail FIG. 2. Trace Control Register 101 and Base Write Address Register 201 are both coupled to Trace Control Logic 1001. In addition, a Timer Register 1003 is coupled to Trace Control Logic 1001. Timer Register may be driven by any timer source associated with the Execution Unit 901 or may be driven by another timer source that is relevant to the timing of operation of the Execution Unit 901.

Figure 11:
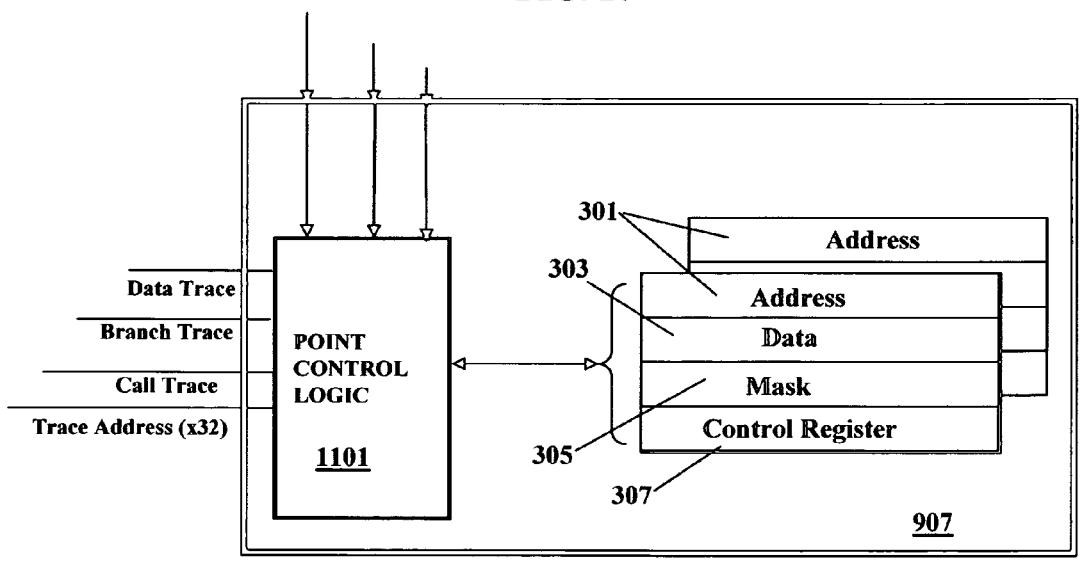
FIG. 11 is a block diagram of a Point Control portion of the microprocessor of FIG. 9.

FIG. 11 shows Breakpoint Control 907 in greater detail. Breakpoint Control 907 includes the sets of registers 301, 303, 305, 307 shown in detail FIGS. 3A, 3B, 3C, and 3D, i.e., Break Point Address/Watch Point Base Address Register 301, Watch Point Data Register 303, Watch Point Data Mask Register 305 and the Break/Watch Point Control Registers 307. The sets of registers 301, 303, 305, 307 are coupled to Point Control Logic 1101.

Trace data can be written to memory in one of three ways:
1. Single address. In this approach a single word of memory space is used as the target for all data written out. This assumes an external device (such as a logic analyzer) to capture the data for later analysis.
2. Single-shot buffer. A buffer of programmable length is established in memory 911. Data is written to the buffer from beginning to end. When the buffer is full the tracing operation is stopped.
3. Circular buffer. A buffer of programmable length is established in memory. Data is written to the buffer memory 911 from beginning to end. When the buffer memory 911 fills data writes are wrapped to the beginning of the buffer and the process is started again. By reading the trace control registers the user can determine where the buffer 'begins' and 'ends' (i.e. where the interface between the oldest data and the newest data is in the buffer), as well as whether the buffer has wrapped over yet or not.

Another option for using the buffer memory 911 is to fill it with data trace rather than code execution trace. In this case the user specifies a memory location or range of locations and, optionally, a data mask to filter the contents of writes to the memory 911, when a write occurs to the specified location(s) the data written is mirrored to the trace buffer. An example application would be to trace on all data received over a UART to try to debug associated driver code.

The trace feature is controlled by a group of registers shown in FIGS. 1, 2, 3A, 3B, 3C, 3D.

One register is the Trace Control Register 101. The Trace Control Register 101 shown in FIG. 1 includes nine register fields:

The Enable field is a one bit field enabled by software, break/watch point and disabled by software, break/watch point or when the trace buffer memory is full. The two states that this field defines are:
0=Disable
1=Enable The Full Flag field comprises one bit that is used by simple buffer mode. The bit is set when the buffer fills and is cleared by software writing a 1 to this bit. If the bit is set, hitting break/watch point will not re-enable tracing.

The Timing Mode field is a one bit field. When the bit=0, the Timing is disabled; when the bit=1, the Timing is enabled. This enables a timer value to be written out for each write to buffer (A7).

The Trace Mode field is a two-bit field that defines four states by the binary code:
00=reserved
01=Call Tracing Mode
10=Branch Tracing Mode
11=Data Tracing Mode The Buffer Mode field specifies a trace buffer mode. Three of the codes are used as follows:
00=single address mode
01=circular buffer mode
10=simple buffer mode The Size field is a four bit field used to define the buffer size (used in the case of the buffer modes). The codes and associated sizes are:
0000=32 bytes
0001=64 bytes
0010=128 bytes
0011=256 bytes
0100=512 bytes
0101=1K bytes
0110=2K bytes
0111=4K bytes
1000=8K bytes
1001=16K bytes
1010=32K bytes
1011=64K bytes
1100=128K bytes
1101=256K bytes
1110=512K bytes
1111=1M bytes A Base Address Register 201 is provided as a 32 bit register as shown in FIG. 2. The base address is a multiple of the size. Hardware treats the least significant n bits as zeros. There are two modes for this feature—a single address mode and a buffer mode. The buffered modes require base to be on size boundary.

For a Single address mode, all data is written to the same address. This would likely be captured by a logic analyzer and post processed as needed.

For a Circular Buffer mode, data is written to a memory buffer and when the memory buffer is full, it loops around to the beginning. The Base Address Register 201 always points to the next location to be written, i.e., it is incremented as the buffer is written, then the lower bits are cleared when the end of the buffer is reached. In circular buffer mode, when the end of the buffer is reached, a Full Flag is set and remains set until cleared by software.

For a Simple Buffer mode, once the buffer is filled to capacity, tracing is disabled, i.e., the Enable bit is cleared, and break/watch points cannot re-enable until the Full Flag is cleared.

The contents of the Base Address Register 201 always points to the next location to be written to, i.e., it is incremented as the buffer is written, then the lower bits are cleared when the end of the buffer is reached. In Simple Buffer mode, when the end of the buffer is reached, the Full Flag is set and remains set until cleared by software.

A set of hardware break/trace registers shown in FIG. 3A, 3B, 3C, and 3D. The set is repeated a plurality of times, once for each break/watch point. In the illustrative embodiment, the set is repeated eight times.

Figure 3D:
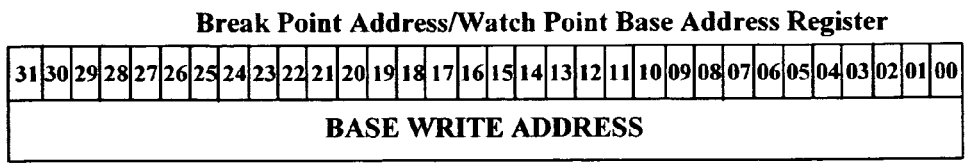
Figure 3D:
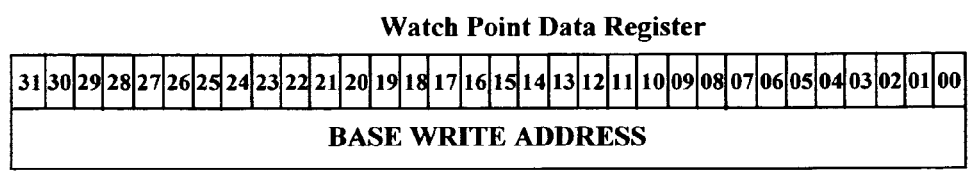
Figure 3D:
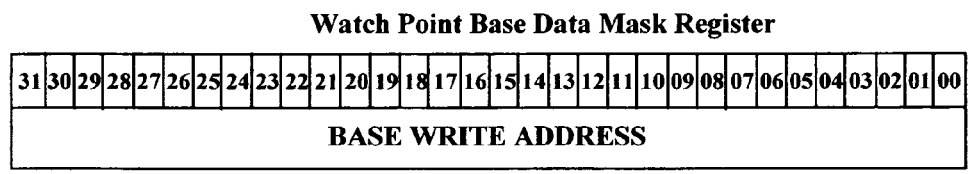
Figure 3D:
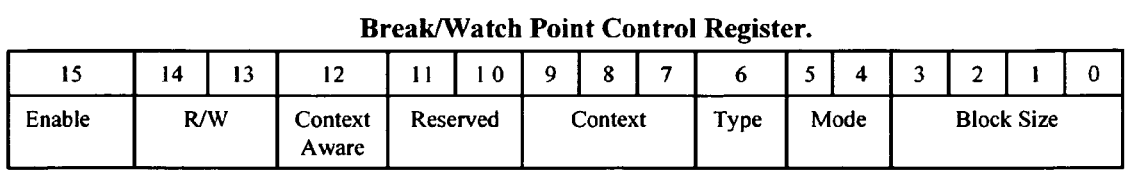

The break/watch Point Control Register 307 shown in FIG. 3D has eight fields. The two states that this field defines are:
0=Disable
1=Enable.

The R/W field specifies a watch point memory cycle type. The four states that this field defines are:
00=Read or Write
01=Write
10=Read
11=Reserved.

The Context Aware field is a two bit field. The two states that this field defines are:
0=Any context will do.
1=Specified context only.

A three bit Context field is used if break/watch points are context specific.

A Type field is a one bit field that defines the functionality type. The two states that this field defines are:
0=Breakpoint
1=Watchpoint A Mode field is a two bit field that defines an operational mode. The four states that this field defines are:
00=Disable trace (disable currently running trace)—Added for A16
01=Enable trace-mode defined by DebugTraceBufferRegisters.
10=Break Point
11=Chain, enable next breakpoint/watchpoint, last one in chain triggers break or trace.

A Block Size field is a four bit field. The watch point will "watch" memory in the block sizes:
0000—1 Byte
0001—2 Bytes
0010—4 Bytes
0011—8 Bytes
0100—16 Bytes
0101—32 Bytes
0110—64 Bytes
0111—128 Bytes
1000—256 Bytes
1001—512 Bytes
1010—1024 Bytes
101—2048 Bytes
1100—4096 Bytes
1101—8192 Bytes
1110—16384 Bytes
1111—32768 Bytes To enable call trace a user sets up registers as follows:
Base Write Address of FIG. 2 set to provide a base address for buffer (user selected)—in internal user RAM or external SRAM or SDRAM.
Trace Control Register of FIG. 1:
Enable=Enabled
Trace Mode=Call Tracing Mode
Buffer Mode/Buffer Size=user selectable Once this is set up, the following behaviors are enabled:
Execution of a BSR (Branch to Subroutine) or JSR (Jump to Subroutine) instruction will cause the 32-bit address of the called subroutine to be written out to the trace buffer.
Execution of a RTS (Return from Subroutine) or RTD (Return and Deallocate) instruction will cause the 32-bit address of the instruction returned to be written out to the trace buffer.
Execution of an exception (interrupt or fault) will cause the 32-bit address of the exception handler to be written out to the trace buffer.
Execution of a RTE (Return from Exception) instruction will cause the 32-bit address of the instruction returned to be written out to the trace buffer.

A Change of hardware context will cause the number of the new context to be written to the trace buffer (as a 32-bit integer).

To enable branch trace the user would set up registers as follows:
Base Write Address Register 201 of FIG. 2 is set to a base address for a user selected buffer—an internal user RAM or external SRAM or SDRAM.
The Trace Control Register of FIG. 1 is set up as follows:
Enable=Enabled
Trace Mode=Branch Tracing Mode
Buffer Mode/Buffer Size=user selectable Once the registers are set up, the following behaviors are enabled:
All behaviors activated during Call Trace (see above);
Execution of an Unconditional Branch instruction (JMP, BRA) will cause the address branched to be written to the trace buffer;
Execution of a Conditional Branch instruction (Bcc, DBcc, where 'cc' is a specific condition, e.g., EQ, NE, PL) will cause the next address to be executed to be written to the trace buffer. That is, if the branch is taken, then the address of the branch target will be written; if the branch is not taken, then the address of the instruction following the branch instruction will be written.

A Data Trace requires the setup of both the Trace Control Register 101 of FIG. 1 and at least one set of Break/Watchpoint Registers 301, 303, 305, 307 of FIGS. 3A, 3B, 3C, 3D. The Trace Control Register 101 of FIG. 1 controls where the data gets written out, the Break/Watchpoint registers 301, 303, 305, 307 of FIGS. 3A, 3B, 3C, 3D determine what data gets written out. The Registers 101, 201 301, 303, 305, 307 are setup as follows:

The Base Write Address Register 201 of FIG. 2 is set to the base address for the trace buffer by the user. The base address may be for internal user RAM or external SRAM or SDRAM.

Trace Control Register 101 of FIG. 1 is set as follows:
Enable field is set to enable;
Trace Mode is set to the Data Tracing Mode; and
Buffer Mode/Buffer Size is selected by the user.

The Break Point Address/Watch Point Base Address Register 301 of FIG. 3A is set to the address of data to be traced The Watch Point Data Register 303 of FIG. 3B is optionally set to a data pattern to be traced.

The Watch Point Data Mask Register 305 of FIG. 3C is set to define what portions of a 32-bit word are to be compared to the Watch Point Data Register. For example, all zeros means trace on any data pattern.

The Break/Watch Point Control Register 307 of FIG. 3D is set as follows:
Enable=Enabled
R/W=User selectable (trace only reads, only writes, or reads and writes).
Context Aware=User selectable (trace all contexts or only one)
Context=User selection
Type=Watchpoint
Mode=Enable Trace
Block Size=User selection With the above register arrangement, when a memory access meets the parameters set up in the Watchpoint registers 301, 303, 305, 307 of FIGS. 3A, 3B, 3C, 3D, the data written/read to/from the traced address range will be copied into the trace buffer.

For any of the trace modes, i.e., Call Trace, Branch Trace, or Data Trace, if the timing field flag of the Trace Control Register 101 of FIG. 1 is set, the trace behavior is changed such that prior to writing out the data/address as usual, a 32-bit timer value is written out first. This gives a trace buffer organized as:
Time
Data
Time
Data
Time
Data.

Where "Data" is either an address in Call Trace or Branch Trace mode or the data captured in Data Trace. This allows the user to determine what the timing is on various accesses including the time spent in a given subroutine or other program.

The timer value can come from a number of sources of different periods or precision.

Using the breakpoint registers described above, either in breakpoint mode or data trace mode, tracing can be enabled or disabled by various system events.

By way of example, in the register setups set out above if the enable flag in the Trace Control Register 101 of FIG. 1 is disabled and a breakpoint is in the mode field of the Break/Watchpoint Control Register 307 of FIG. 3D is set to enable trace, when the event defined in the break/watch point occurs the trace begins, rather than breaking code execution.

Similarly, if the mode of the Break/Watchpoint Control Register 307 of FIG. 3D is set to disable trace, a breakpoint can be used to disable a trace that is currently executing. Using this approach, trace can be set to start on some event, or some sequence of events using the chaining feature of the breakpoints, and end on another event, tracing only the portion of execution that the user is interested in.

Figure 4:
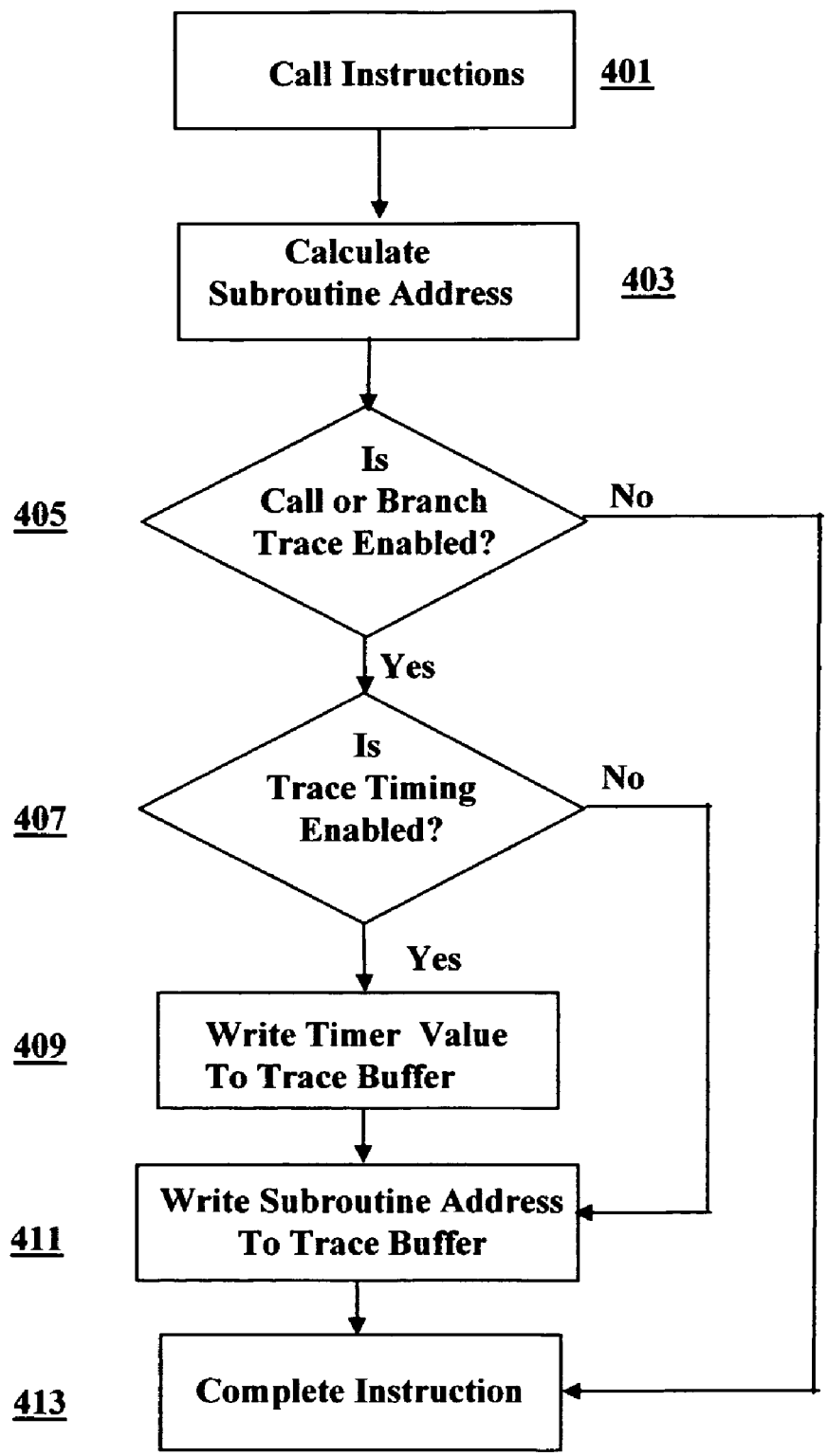
FIGS. 4 through 8 are flow diagrams of trace functions in accordance with the principles of the invention.

Turning now to FIG. 4, the trace function for a call instruction is shown. When a call instruction is identified at step 401, the subroutine address is calculated at step 403. At step 405, a determination is made as to whether or not the Trace Control Register 101 is set to enable either a Call or Branch Trace. If not, the instruction is completed at step 413. If it is determined that the Trace Control Register 101 is set to enable either a Call or Branch Trace at step 405, then a determination is made at step 407 as to whether or not the Trace Timing mode is called out by the Trace Control Register 101. If not, the subroutine address is written to the Trace Buffer 911 at step 411. If Trace Timing is called for at step 407, then at step 409 the timer value is written to Trace Buffer 911 and then the subroutine address is written to the Trace Buffer at step 411. After the subroutine address is written to the Trace Buffer 911, the instruction is completed at step 413.

Figure 5:
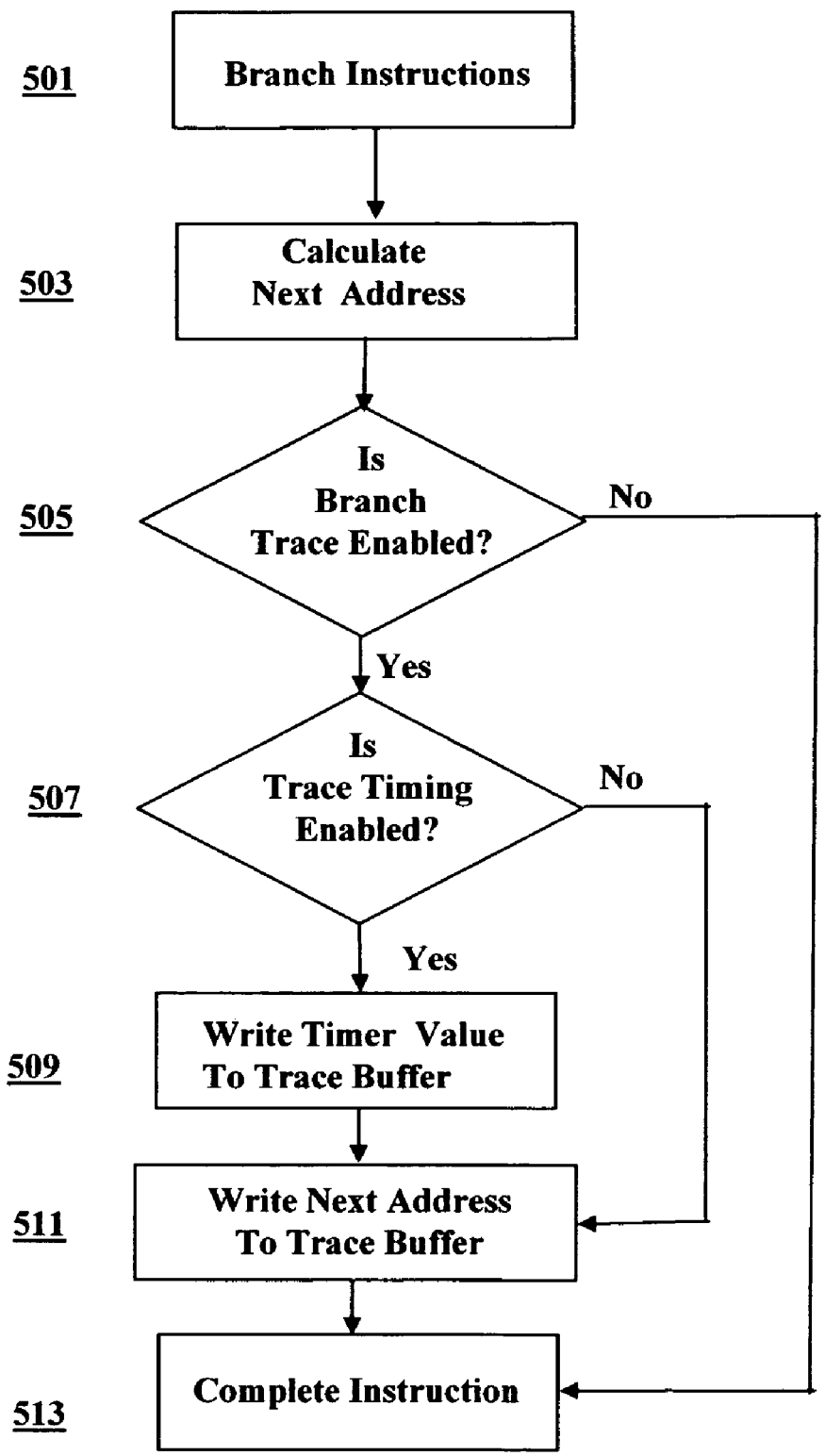

Turning now to FIG. 5, the trace function for a branch instruction is shown. When a call instruction is identified at step 501, the next instruction address is calculated at step 503. At step 505, a determination is made as to whether or not the Trace Control Register 101 is set to enable a Branch Trace. If not, the instruction is completed at step 513. If it is determined that the Trace Control Register 101 is set to enable a Branch Trace at step 505, then a determination is made at step 507 as to whether or not the Trace Timing mode is called out by the Trace Control Register 101. If not, the next address is written to the Trace Buffer 911 at step 511. If Trace Timing is called for at step 507, then at step 509 the timer value is written to Trace Buffer 911 and then the address is written to the Trace Buffer 911 at step 511. After the subroutine address is written to the Trace Buffer 911, the instruction is completed at step 513.

Figure 6:
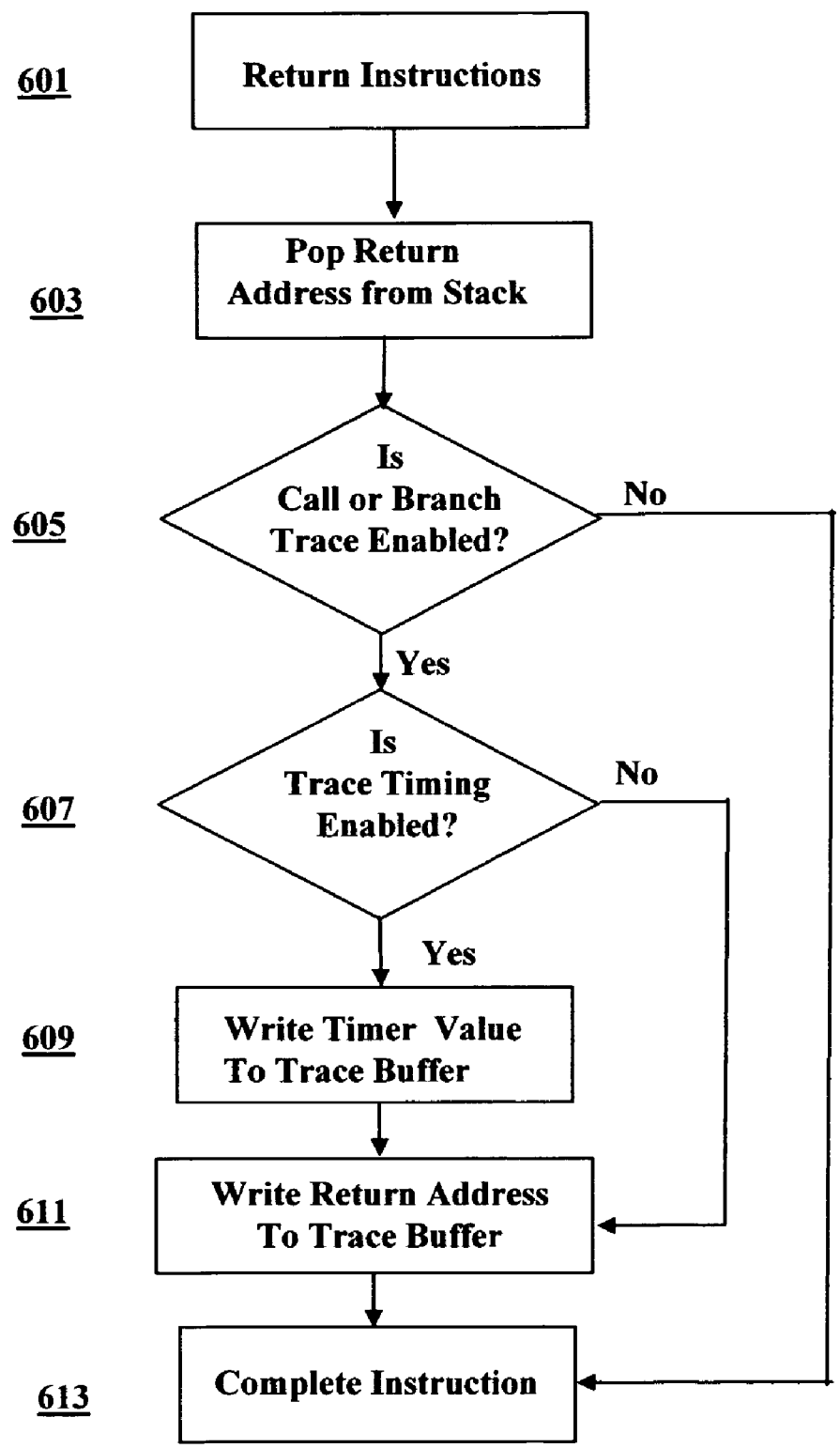

Turning now to FIG. 6, the trace function for a return instruction is shown. When a return instruction is identified at step 601, a return address is obtained at step 603. At step 605, a determination is made as to whether or not the Trace Control Register 101 is set to enable either a Call or Branch Trace. If not, the instruction is completed at step 613. If it is determined that the Trace Control Register 101 is set to enable either a Call or Branch Trace at step 605, then a determination is made at step 607 as to whether or not the Trace Timing mode is called out by the Trace Control Register 101. If not, the return address is written to the Trace Buffer 911 at step 611. If Trace Timing is called for at step 607, then at step 609 the timer value is written to Trace Buffer 911 and then the return address is written to the Trace Buffer 911 at step 611. After the subroutine address is written to the Trace Buffer 911, the instruction is completed at step 613.

Figure 7:
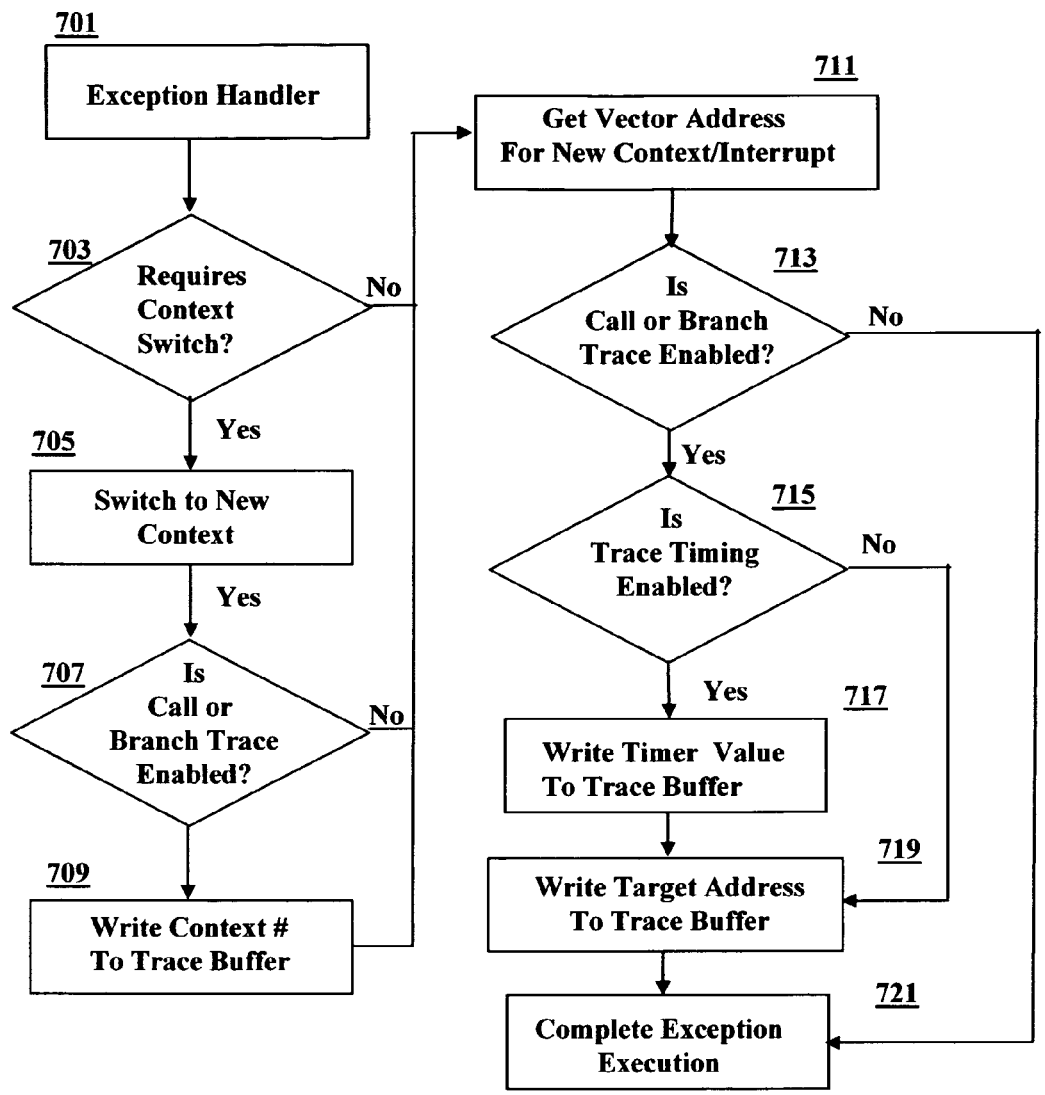

Turning now to FIG. 7, the trace function for when contexts are switched is shown. When an exception is identified at step 701, a determination is made at step 703 as to whether or not a context switch is required. If a context switch is required, a switch is made to the new context at step 705. Then a determination is made at step 707 as to whether or not the Trace Control Register 101 is set to enable either a Call or Branch Trace. If it is determined that the Trace Control Register 101 is set to enable either a Call or Branch Trace then the Context number is written to the Trace Buffer 911 at step 709.

After the context number is written to the Trace Buffer 911 at step 709, or if at step 703 it is determined that a context switch is not required, or if at step 707 it is determined that the Trace Control Register 101 is not set to enable a Call or Branch trace, then a vector address for a new context/interrupt is obtained at step 711. After obtaining a vector address for the new context/interrupt at step 711, a determination is made at step 713 as to whether a Call Trace or a Branch Trace is enabled.

If it is determined at step 713 that neither a Call Trace nor a Branch Trace is enabled for that context, then the exception execution is completed at step 721. If, at step 713, it is determined that a Call Trace or Branch Trace is enabled, then a determination is made at step 715 as to whether or not the Trace Timing mode is called out by the Trace Control Register 101. If not, the target address is written to the Trace Buffer 911 at step 719. If Trace Timing is called for at step 715, then at step 717 the timer value is written to Trace Buffer 911. After the target address is written to the Trace Buffer, the exception execution is completed at step 721.

Figure 8:
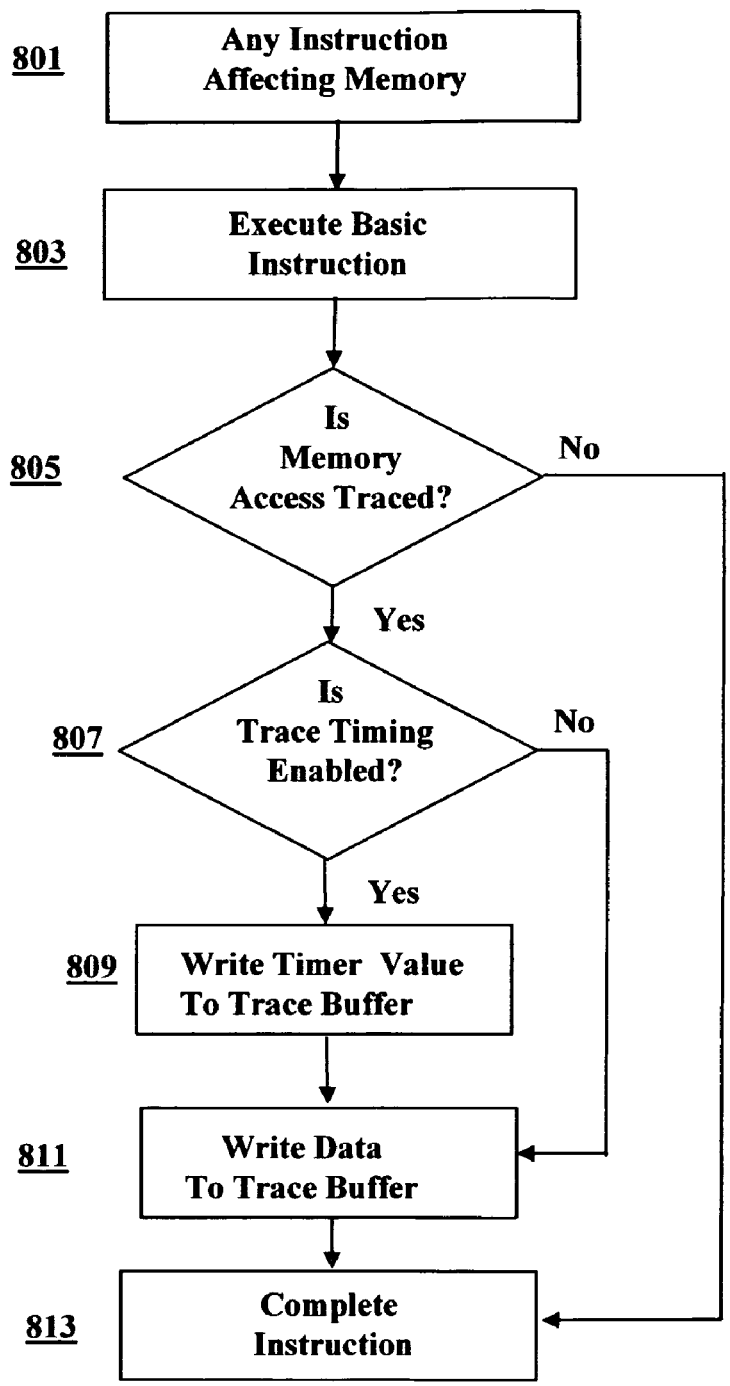

Turning now to FIG. 8, the Memory Access Trace function is shown. At step 801, any instruction that affects memory is identified. At step 803, the basic instruction is executed. At step 805 it is determined whether or not the Memory Access Trace function is enabled in Trace Control Register 101. If not, the instruction is completed at step 813. If it is determined that the Memory Access Trace function is enabled, then a determination is made to determine if Trace Timing is called for at step 807. If trace timing is called for, then at step 809 the timer value is written to Trace Buffer 911. The memory data is written to the Trace Buffer 911 at step 811 and then the instruction is completed at step 813.

The invention has been described in conjunction with the illustrative embodiment. As will be appreciated by those skilled in the art, the invention is not limited to the specific embodiment shown. Various changes and modifications may be made to the embodiment without departing from the spirit or scope of the invention. It is intended that the invention be limited only by the claims appended hereto. It is further intended that the claims be given the broadest scope to which they are permitted.

What is claimed is:

1. A method for providing trace functionality for a microprocessor comprising an execution unit, said method comprising:
   providing a memory coupled to said execution unit,
   utilizing said memory to store trace data during a trace operation;
   providing hardware integrated with said microprocessor and utilizable during a trace operation to assist in said trace operation
   providing a trace control coupled to said execution unit and to said memory;
   providing a breakpoint control coupled to said execution unit, said trace control and said memory;
   providing a plurality of sets of programmable registers coupleable to said breakpoint control, and each set comprising a base address register, a data register, a data mask register and a control register;
   providing in said trace control a programmable trace control register and a programmable base write address register, said trace control register being programmable to determine one of a plurality of trace functions; and
   integrating said trace control, said breakpoint control and said plurality of sets of programmable registers with said execution unit.

2. A method in accordance with claim 1, comprising:
   selecting said plurality of trace functions to include one or more of a call trace, a branch trace and a data trace.

3. A method in accordance with claim 2, comprising:
   storing trace obtained data into a user selectable portion of said memory.

4. A method in accordance with claim 3, wherein:
   said user selectable portion of said memory comprises one of a memory associated with said execution unit or an external trace memory.

5. A method in accordance with claim 4, comprising:
   programming said programmable trace control register to select at least one of a single address trace, a single-shot buffer trace and a circular buffer trace, and wherein said single address trace uses a single word of address for all trace data written out, wherein said single-shot buffer utilizes a programmable length of said trace buffer memory, and wherein said circular buffer trace utilizes a programmable length of said memory portion in which data writes are wrapped.

6. A method in accordance with claim 5, comprising:
   utilizing said programmable trace control register to select one of a data trace and code execution trace.

7. A method in accordance with claim 6, comprising:
   utilizing said programmable trace control register to select a timed trace in which the time of the occurrence of each write to said memory is stored in said memory portion.

8. A method in accordance with claim 2, comprising:
   programming said programmable trace control register to select at least one of a single address trace, a single-shot buffer trace and a circular buffer trace, and wherein said single address trace uses a single word of address for all trace data written out to said memory portion, wherein said single-shot buffer comprises a memory portion of programmable length, and wherein said circular buffer trace utilizes a programmable memory portion length and in which data writes are wrapped over said length.

9. A method in accordance with claim 8, comprising:
   utilizing said programmable trace control register to select one of a data trace and code execution trace.

10. A method in accordance with claim 9, comprising:
    utilizing said programmable trace control register to select a timed trace in which the time of the occurrence of each write to said memory is stored in said memory portion.

11. A method in accordance with claim 1, comprising:
    programming said programmable trace control register to select at least one of a single address trace, a single-shot buffer trace and a circular buffer trace, and wherein said single address trace uses a single word of address of said memory for all trace data written out, wherein said single-shot buffer comprises a programmable length of said memory portion, and wherein said circular buffer trace utilizes a programmable length of said memory portion in which data writes are wrapped.

12. A method in accordance with claim 11, comprising:
    utilizing said programmable trace control register to select one of a data trace and code execution trace.

13. A method in accordance with claim 12, comprising:
    utilizing said programmable trace control register to select a timed trace in which the time of the occurrence of each write to said memory is stored in said memory portion.

14. A method for providing trace functionality for a microprocessor comprising an execution unit, said method comprising:
    providing a buffer memory coupled to said execution unit, said buffer memory utilized to store trace data during operation of said execution unit;
    providing a trace control coupled to said execution unit and to said buffer memory;
    providing a breakpoint control coupled to said execution unit, said trace control and said buffer memory;
    providing a plurality of sets of programmable registers coupleable to said breakpoint control, and each set comprising a base address register, a data register, a data mask register and a control register;
    providing in said trace control a programmable trace control register and a programmable base write address register, said trace control register being programmable to determine one of a plurality of trace functions.

15. A method in accordance with claim 14, comprising:
    selecting said plurality of trace functions to include one or more of a call trace, a branch trace and a data trace.

16. A method in accordance with claim 15, comprising:
    storing trace obtained data into a user selectable trace buffer memory.

17. A method in accordance with claim 16, wherein:
    said user selectable trace buffer memory comprises one of a memory associated with said execution unit or an external trace memory.

18. A method in accordance with claim 17, comprising:
programming said programmable trace control register to select at least one of a single address trace, a single-shot buffer trace and a circular buffer trace, and wherein said single address trace uses a single word of address for all trace data written out, wherein said single-shot buffer utilizes a programmable length of said trace buffer memory, and wherein said circular buffer trace utilizes a programmable length of said trace buffer memory in which data writes are wrapped.

19. A method in accordance with claim 18, comprising:
utilizing said programmable trace control register to select one of a data trace and code execution trace.

20. A method in accordance with claim 19, comprising:
utilizing said programmable trace control register to select a timed trace in which the time of the occurrence of each write to trace buffer memory is stored in said trace buffer memory.

21. A method in accordance with claim 15, comprising:
programming said programmable trace control register to select at least one of a single address trace, a single-shot buffer trace and a circular buffer trace, and wherein said single address trace uses a single word of address for all trace data written out to a trace buffer memory, wherein said single-shot buffer comprises a trace buffer memory of programmable length, and wherein said circular buffer trace utilizes a programmable trace buffer memory length and in which data writes are wrapped over said length.

22. A method in accordance with claim 21, comprising:
utilizing said programmable trace control register to select one of a data trace and code execution trace.

23. A method in accordance with claim 22, comprising:
utilizing said programmable trace control register to select a timed trace in which the time of the occurrence of each write to trace buffer memory is stored in said trace buffer memory.

24. A method in accordance with claim 14, comprising:
programming said programmable trace control register to select at least one of a single address trace, a single-shot buffer trace and a circular buffer trace, and wherein said single address trace uses a single word of address of a trace buffer memory for all trace data written out, wherein said single-shot buffer comprises a trace buffer memory of programmable length in a memory, and wherein said circular buffer trace utilizes a programmable trace buffer memory length in which data writes are wrapped.

25. A method in accordance with claim 24, comprising:
utilizing said programmable trace control register to select one of a data trace and code execution trace.

26. A method in accordance with claim 25, comprising:
utilizing said programmable trace control register to select a timed trace in which the time of the occurrence of each write to trace buffer memory is stored in said trace buffer memory.

27. A method in accordance with claim 14, comprising:
utilizing said programmable trace control register to select one of a data trace and code execution trace.

28. A method in accordance with claim 14, comprising:
utilizing said programmable trace control register to select a timed trace in which the time of the occurrence of each write to trace buffer memory is stored in said trace buffer memory.

29. A method in accordance with claim 14, comprising:
utilizing said programmable trace control register to select one of a data trace and code execution trace.

30. A method in accordance with claim 29, comprising:
utilizing said programmable trace control register to select a timed trace in which the time of the occurrence of each write to trace buffer memory is stored in said trace buffer memory.

31. A method in accordance with claim 14, comprising:
utilizing said break point control to programmably select a mode of tracing when context switching occurs in said execution unit.

32. A method in accordance with claim 31, comprising:
utilizing said break point control to programmably selecting said mode of tracing for a plurality of contexts.

33. A method in accordance with claim 32, comprising:
selecting said plurality of trace functions to include one or more of a call trace, a branch trace and a data trace.

34. A method in accordance with claim 33, comprising:
storing trace obtained data into a user selectable trace buffer memory.

35. A method in accordance with claim 34, wherein:
said user selectable trace buffer memory comprises one of a memory associated with said execution unit or an external trace memory.

36. A method in accordance with claim 35, comprising:
programming said programmable trace control register to select at least one of a single address trace, a single-shot buffer trace and a circular buffer trace, and wherein said single address trace uses a single word of address for all trace data written out, wherein said single-shot buffer utilizes a programmable length of said trace buffer memory, and wherein said circular buffer trace utilizes a programmable length of said trace buffer memory in which data writes are wrapped.

37. A method in accordance with claim 36, comprising:
utilizing said programmable trace control register to select one of a data trace and code execution trace.

38. A method in accordance with claim 37, comprising:
utilizing said programmable trace control register to select a timed trace in which the time of the occurrence of each write to trace buffer memory is stored in said trace buffer memory.

39. A method in accordance with claim 33, comprising:
programming said programmable trace control register to select at least one of a single address trace, a single-shot buffer trace and a circular buffer trace, and wherein said single address trace uses a single word of address for all trace data written out to a trace buffer memory, wherein said single-shot buffer comprises a trace buffer memory of programmable length, and wherein said circular buffer trace utilizes a programmable trace buffer memory length and in which data writes are wrapped over said length.

40. A method in accordance with claim 39, comprising:
utilizing said programmable trace control register to select one of a data trace and code execution trace.

41. A method in accordance with claim 40, comprising:
utilizing said programmable trace control register to select a timed trace in which the time of the occurrence of each write to trace buffer memory is stored in said trace buffer memory.

42. A method in accordance with claim 32, comprising:
programming said programmable trace control register to select at least one of a single address trace, a single-shot buffer trace and a circular buffer trace, and wherein said single address trace uses a single word of address of a trace buffer memory for all trace data written out, wherein said single-shot buffer comprises a trace buffer memory of programmable length in a memory, and wherein said circular buffer trace utilizes a programmable trace buffer memory length in which data writes are wrapped.

43. A method in accordance with claim 42, comprising:
utilizing said programmable trace control register to select one of a data trace and code execution trace.

44. A method in accordance with claim 43, comprising:
utilizing said programmable trace control register to select a timed trace in which the time of the occurrence of each write to trace buffer memory is stored in said trace buffer memory.

45. A method in accordance with claim 32, comprising:
utilizing said programmable trace control register to select one of a data trace and code execution trace.

46. A method in accordance with claim 32, comprising:
utilizing said programmable trace control register to select a timed trace in which the time of the occurrence of each write to trace buffer memory is stored in said trace buffer memory.

47. A method in accordance with claim 46, comprising:
utilizing said programmable trace control register to select one of a data trace and code execution trace.

48. A microprocessor, comprising:
an execution unit operable in a plurality of contexts:
a memory coupled to said execution unit, said memory utilized to store trace data during operation of said execution unit;
a trace control coupled to said execution unit and to said memory;
a breakpoint control coupled to said execution unit, said trace control and said memory;
said breakpoint control comprising: a plurality of sets of programmable registers, each set of programmable registers being provided for a corresponding one context of said plurality of contexts and each set comprising a base address register, a data register, a data mask register and a control register;
said trace control comprising a programmable trace control register and a programmable base write address register, said trace control register being programmable to determine one of a plurality of trace functions.

49. A microprocessor in accordance with claim 48, comprising:
a user selectable portion of said memory for storing trace data.

50. A microprocessor in accordance with claim 49, wherein:
said user memory comprises one of a memory associated with said execution unit or an external trace memory.

* * * * *